(12) United States Patent
Selkirk et al.

(10) Patent No.: US 9,329,633 B2
(45) Date of Patent: *May 3, 2016

(54) MODULAR DOCKING STATION FOR ENCLOSING MOBILE DEVICES

(71) Applicants: Bosch Automotive Service Solutions Inc., Warren, MI (US); Robert Bosch GmbH, Stuttgart (DE)

(72) Inventors: Reed Selkirk, Kalamazoo, MI (US); William W. Wittliff, Gobles, MI (US); James Fish, Birmingham, MI (US)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,847

(22) Filed: Aug. 19, 2014

(65) Prior Publication Data

US 2014/0359188 A1 Dec. 4, 2014

Related U.S. Application Data

(63) Continuation of application No. 13/492,160, filed on Jun. 8, 2012, now Pat. No. 8,811,008.

(51) Int. Cl.
*G06F 1/16* (2006.01)
*G06F 13/40* (2006.01)

(52) U.S. Cl.
CPC .......... *G06F 1/1632* (2013.01); *G06F 13/4081* (2013.01); *G06F 2200/1633* (2013.01)

(58) Field of Classification Search
USPC ............... 455/412, 566, 575.1, 575.3, 412.1, 455/67.7, 573, 557, 521; 349/58, 59, 64, 349/65; 248/70, 351, 206.4, 301, 541, 248/311.2, 334.1, 323, 293.1, 237, 319.2, 248/231.1, 231.2, 245, 265.6; 361/679.01, 361/679.02, 679.22, 679.27, 679.3, 679.55, 361/679.56, 679.21, 679.07, 679.26, 361/679.09, 679.41, 679.2; 345/698, 102, 345/600, 660, 211, 99, 100, 690, 179; 381/79; 99/295
See application file for complete search history.

(56) References Cited

U.S. PATENT DOCUMENTS

| | | | |
|---|---|---|---|
| 6,044,422 A | 3/2000 | Tran | |
| 6,119,237 A | 9/2000 | Cho | |
| 6,646,866 B2 | 11/2003 | Kao | |
| 6,816,760 B1 | 11/2004 | Namaky | |
| 8,811,008 B2 * | 8/2014 | Selkirk et al. | 361/679.41 |
| 2012/0054401 A1 | 3/2012 | Cheng | |
| 2012/0185267 A1 * | 7/2012 | Kamen et al. | 705/2 |
| 2012/0225622 A1 | 9/2012 | Kudrna et al. | |
| 2014/0264075 A1 * | 9/2014 | LaPorte et al. | 250/455.11 |
| 2015/0144003 A1 * | 5/2015 | Talon | A47J 31/005 99/295 |
| 2015/0296282 A1 * | 10/2015 | Fujioka | H04R 1/02 381/79 |

* cited by examiner

*Primary Examiner* — Hung Duong
(74) *Attorney, Agent, or Firm* — Maginot Moore & Beck LLP (57) ABSTRACT

A modular docking station for receiving a mobile device is disclosed. The docking station includes a base component having a plurality of modular apertures configured to receive hardware to perform a specific function. The docking station also includes a receiving component having a protective enclosure configured to receive and protect the mobile device in from environmental containment. The docking station further includes a coupler for coupling the receiving component to the base component.

13 Claims, 9 Drawing Sheets

MODULAR DOCKING STATION FOR ENCLOSING MOBILE DEVICES

FIELD OF THE INVENTION

The present disclosure relates generally to the field of a docking station. More particularly, the present disclosure relates to a modular docking station for enclosing mobile devices.

BACKGROUND OF THE INVENTION

Mobile devices, such as laptop computers, cellular phones, smart phones, personal digital assistants (PDA), media players and other mobile electronic devices have become more robust and prevalent. Mobile devices offer more wireless access to data networks and processing power in order to perform various functions. Oftentimes, mobile devices do not include keyboard, a large display, a mouse, a printer, or any other peripheral devices. Mobile devices may utilize docking stations or port replicators to attach various peripheral devices. For example, a physical connection may be made between the mobile devices and a docking station in order to provide the necessary ports to connect to various peripheral devices.

A docking station may provide a fast and convenient mechanism to allow the mobile devices to attach or detach from peripheral devices. Mobile devices may dock or undock from a docking station hot, cold or standby, depending on the capabilities of the mobile devices. In a cold dock or undock, the mobile devices are shut down before docking or undocking from the docking station. In a hot dock, the mobile devices remain running or active when docked or undocked from a docking station. In a standby dock, the mobile devices remain powered on but require the mobile devices to be placed into a sleep mode prior to docking or undocking from the docking station. However, docking stations are not standardized and are, therefore, often designed to communicate with a specific make, model or a device because of a wide range of mobile devices having different connectors, power signaling, and communication protocols. Moreover, docking stations are fragile and cannot offer protection to the docked mobile devices. In addition, the docking station cannot be updated or upgraded to new software or hardware in order to be compatible with new mobile devices.

SUMMARY OF THE INVENTION

At least in view of the above, it would be desirable to provide novel docking station that may have a unified interface and a modular configuration. The foregoing needs are met, to a great extent, by one or more embodiments of the present invention. According to one such embodiment, a modular docking station including a base component comprising a plurality of modular apertures, wherein each of the plurality of modular apertures configured to receive a hardware to perform a specific function, a receiving component for receiving a mobile device, wherein the receiving component comprises a protective enclosure configured to surround the mobile device in order to protect the mobile device from environmental containment, and a coupler for coupling the receiving component to the base component.

In a second embodiment, a modular docking station including a base component comprising a plurality of modular apertures, wherein each of the plurality of modular apertures is configured to receive a hardware to perform a specific function, means for receiving a mobile device configured to surround the mobile device in order to protect the mobile device; and means for coupling configured to couple the receiving component to the base component.

In a third embodiment, a modular docking station including a base component comprising a plurality of modular apertures, wherein each of the plurality of modular apertures is configured to receive a hardware to perform a specific function, a receiving component configured to receive a mobile device, wherein the receiving component comprises a protective enclosure configured to surround the mobile device in order to protect the mobile device, a coupler configured to couple the receiving component to the base component; and a connection lead configured to be in circuit communication with a vehicle diagnostic system, wherein the connection lead communicatively couples the mobile device to the vehicle diagnostic system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
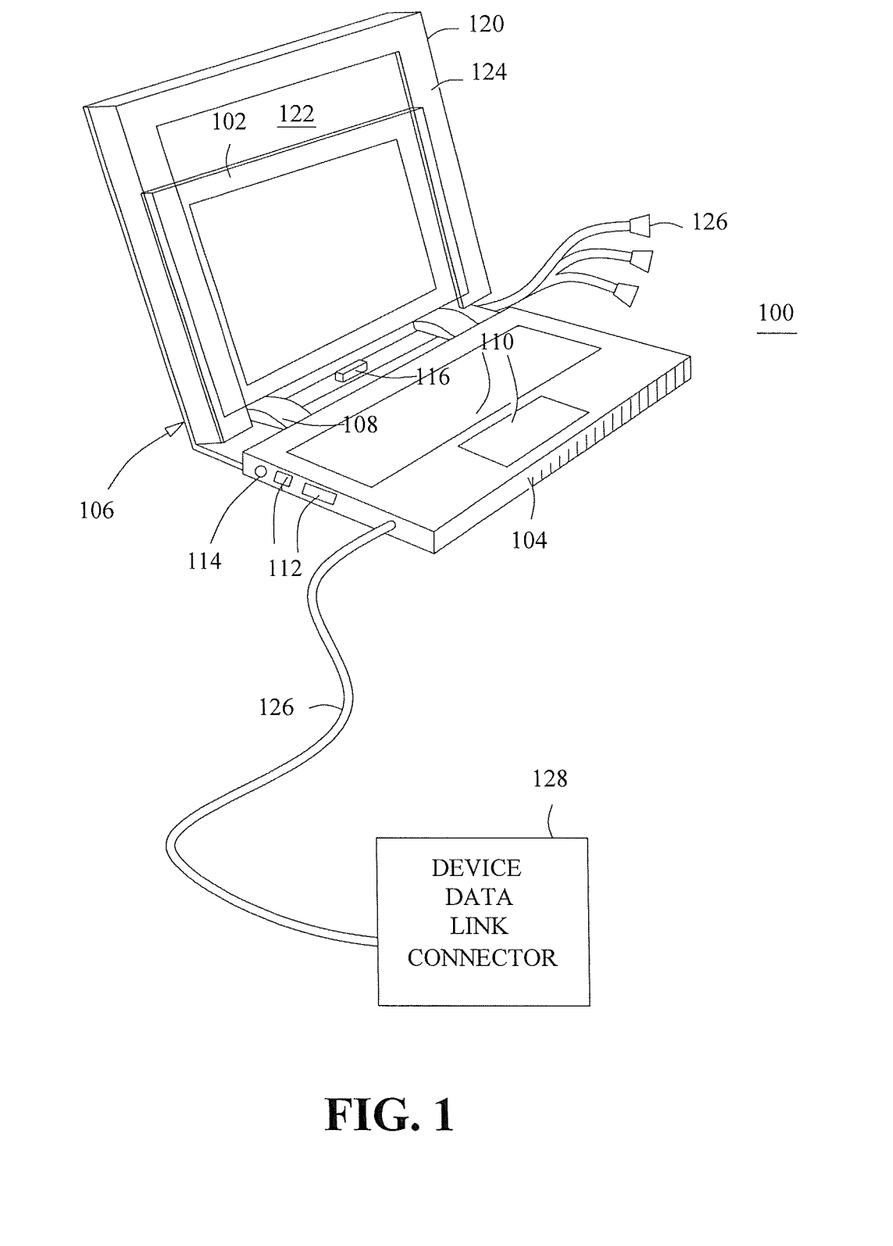
FIG. 1 is a perspective view of a docking station according to an exemplary embodiment of the present disclosure.

The present disclosure will now be described with reference to the drawing figures, in which like reference numerals refer to like parts throughout. FIG. 1 is a schematic diagram of a docking station 100 according to an exemplary embodiment of the present disclosure. The docking station 100 may allow a mobile device 102 to be detachably coupled thereto, and may be used as an extension port of the mobile device 102 to improve the expandability and convenience of the mobile device 102 for the users. The mobile device 102 may include, but is not limited to, a personal computer, a netbook computer, a tablet, a mobile phone, a smart phone, a personal digital assistant (PDA), a media player and other mobile electronic devices. The docking station 100 may include a base component 104 and a receiving component 106. The base component 104 may be coupled to the receiving component 106 via one or more couplers 108. The couplers 108 may be a hinge or a swivel or any other connection mechanisms that allow the receiving component 106 to rotate or turn relative to the base component 104 or vice versa.

The base component 104 may comprise an inputting component 110 that allows a user to input information into the mobile device 102 when the mobile device 102 is attached to the docking station 100. In an exemplary embodiment, the inputting component 110 may include a keyboard, a touch pad, a mouse or any other inputting devices that may allow users to input information into the mobile device 102. The base component 104 may also comprise a plurality of connecting ports 112 and a power connecting port 114. The power connecting port 114 may be coupled to an external power source (e.g., an A/C power source or a DC power source) to supply power to the docking station 100 and the mobile device 102. The plurality of connecting ports 112 may include, for example but not limited to, universal serial bus (USB) port, Ethernet port, firewire, IEEE 1394 interface port, parallel port, PS/2 connector port, serial port, video graphics array (VGA) port, direct attached storage (DAS) port, serial advanced technology attachment (SATA) bus port, high-definition multimedia interface (HDMI) port, digital visual interface (DVI) port, digital visual interface port, small computer system interface (SCSI) port, analog signal port and any other ports that may couple a peripheral device to the docking station 100.

The receiving component 106 may comprise an adapter 116 for communicatively couple the mobile device 102 to the docking station 100. The adapter 116 may be any suitable interface that may communicatively couple the mobile device 102 to the docking station 100. The adapter 116 can be any type of communications interface port, such as a serial port, a USB port, an infrared port, an RS 232 port, a port that is proprietary to the manufacturer of mobile device 102, or any other communication interface ports. The receiving component 106 may also comprise a protective enclosure 120 configured to receive the mobile device 102. The protective enclosure 120 may comprise a display portion 122 that may correspond to a display of the mobile device 102. The display portion 122 may be composed of a transparent material that allows the user to view and protect a display of the mobile device 102. In the event that the mobile device 102 comprises a touch screen, the display portion 122 may be composed of a thin material that may allow the user to use the touch screen of the mobile device 102. The protective enclosure 120 may also comprise a fixing portion 124 for securely hold the mobile device 102 in place. The fixing portion 124 may guide the mobile device 102 to slide down the receiving component 106 to be connected to the adapter 116. For example, the fixing portion 124 may be composed of a rigid material in order to protect the mobile device 102 from harsh or extreme environmental usage. The protective enclosure 120 may be configured to withstand dampen shock or vibrations and resistant to water/moisture, dirt, dust and other environmental elements.

The docking station 100 may include one or more connection leads 126 to be coupled to one or more peripheral devices. In an exemplary embodiment, the connection lead 126 may include a data link connector (DLC) that may be in circuit communication with a vehicle diagnostic system via a vehicle data link connecter 128. The connection lead 126 may enable the mobile device 102 to communicate with the vehicle diagnostic system via the vehicle data link connector 128. In another exemplary embodiment, the connection lead 126 may include a cable having clips to provide a Kelvin type connection between the docking station and the battery of a vehicle (not shown). A Kelvin type connection is a four (4) wire connection, wherein two wires are connected to each terminal of the battery.

Figure 2:
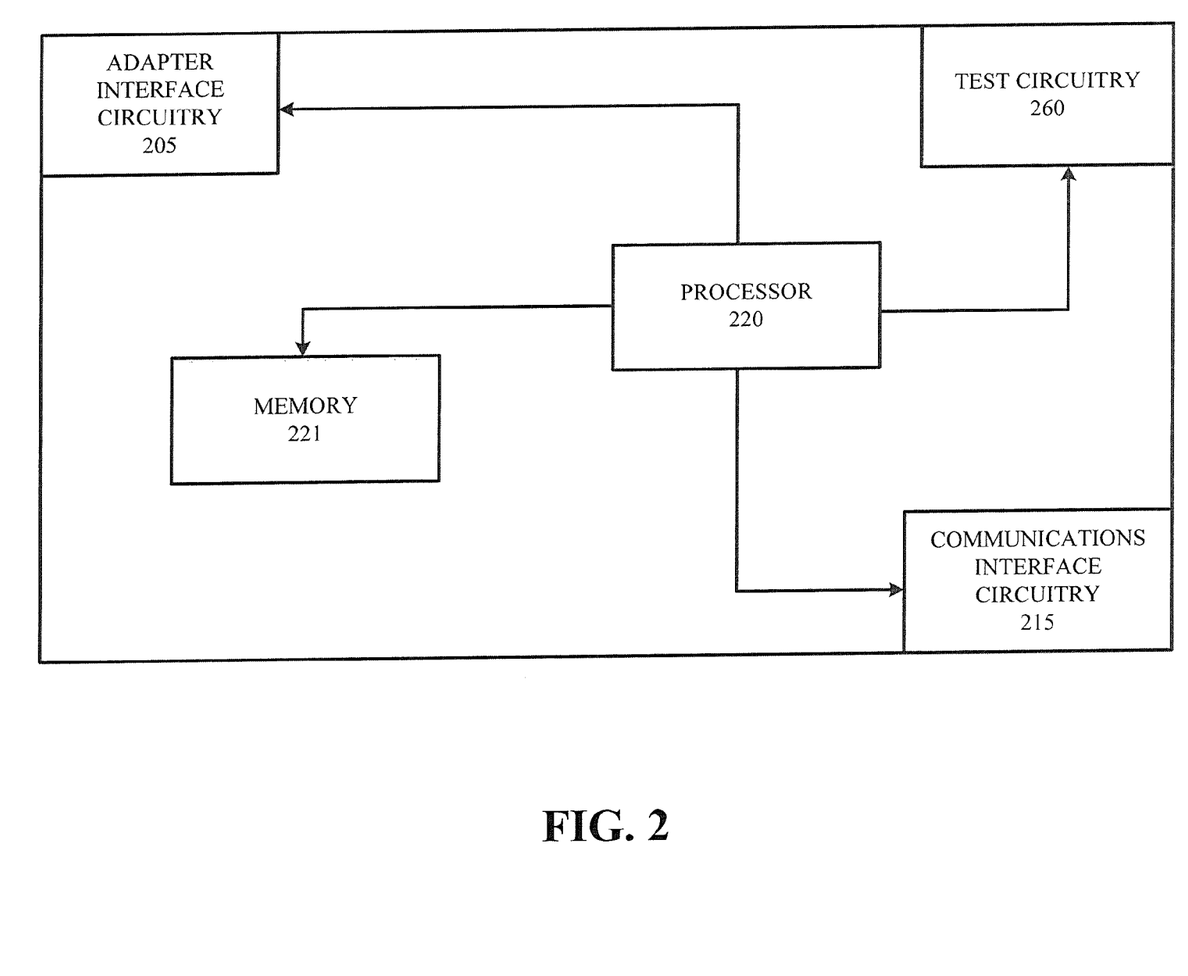
FIG. 2 is a schematic diagram of components of a docking station illustrated in FIG. 1 according to an exemplary embodiment of the present disclosure.

FIG. 2 illustrates a schematic diagram of components of a docking station 100 in accordance with an exemplary embodiment of the present disclosure. The docking station 100 may comprise communications interface circuitry 215 and adapter interface circuitry 205 in circuit communication with a processor 220. The processor circuit 220, also referred to herein as just processor 220, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit. The processor 220 may be in communication with the communications interface circuit 215. The communications interface circuitry 215, and adapter interface circuitry 205 are shown inside the docking station 100 for convenience purposes only and it should be obvious to one skilled in the art that the circuitry could be located outside the docking station 100 in a number of convenient locations.

The communications interface circuit 215 may generate one or more communications protocols with which the docking station 100 and a vehicle computer network communicate with one-another. The communications interface circuit 215 can be implemented either in hardware, or in software, or in a combination of hardware and software. Typical communications protocols generated by the communication interface circuit 215 may include, but are not limited to: SAE J1850 (VPM), SAE J1850 (PWM), ISO 9141-2, and ISO 14230-4 ("Keyword 2000"). The present disclosure is not intended to be limited to any specific communications protocol, or even to electrical communications protocols. Other present and future protocols, such as fiber optic, ISO 15765-4, MS CAN, HS CAN and wireless communications protocols such as Bluetooth protocols and 802.11b protocols, are also contemplated as being within the spirit and scope of the present disclosure.

The adapter interface circuitry 205 may permit the docking station 100 to be connected to the mobile device 102. As noted earlier, adapter interface circuitry 205 of the docking station 100 can be any type of communications interface port, such as a serial port, a USB port, an infrared port, an RS 232 port, an Ethernet port, a port that is proprietary to the manufacturer of the mobile device 102, or any other communications port or wireless link, such as Bluetooth communications link. The adapter interface circuitry 205 of the docking station 100 may facilitate the connection of the mobile device 102 with the docking station 100.

The docking station 100 may include a memory 221 that is separate from the processor 220, but is in circuit communications with the processor 220. The memory 221 may be a random access memory (RAM), a flash memory, hard drive and the like. The memory 221 can contain software that includes error/fault codes, communications protocols, diagnostic procedures, etc. The docking station 100 may simply communicate to the results of the diagnostic tests in a format corresponding to the diagnostic information to the mobile device 102 for display. On the other hand, the function of the docking station 100 may be a communications translator, wherein the mobile device 102 generates the communications protocol, transmits the communications to the docking station 100 via the adapter 116, the docking station 100 receives the communications and passes the communications over the connection lead 126 to the vehicle diagnostic system.

The docking station 100 as described above, however, can be performed by the mobile device 102, modified in accordance with the teachings of the present disclosure. Thus the adaptor 116 could be as simple as a cable to place the mobile device 102 in circuit communications with the vehicle diagnostic system, or eliminated entirely by using wireless communications. In addition, vehicle manufacturers may eliminate the data link connectors located in the occupant compartment, and replace the data link connector with a wireless communicator. It is within the spirit and scope of this disclosure that the mobile device 102 can be connected to the vehicle diagnostic system by a wireless communications port.

The docking station 100 may also include a discrete test circuit 260 in circuit communication with the processor 220. In the alternative, the docking station 100 can consist of discrete test circuit 260 without the processor 220. Additional information relating to the function of the test circuit can be found in U.S. application Ser. No. 09/813,104, now U.S. Pat. No. 6,570,385, entitled "Handheld Tester for Starting/Charging Systems," which is incorporated herein in its entirety.

Figure 3:
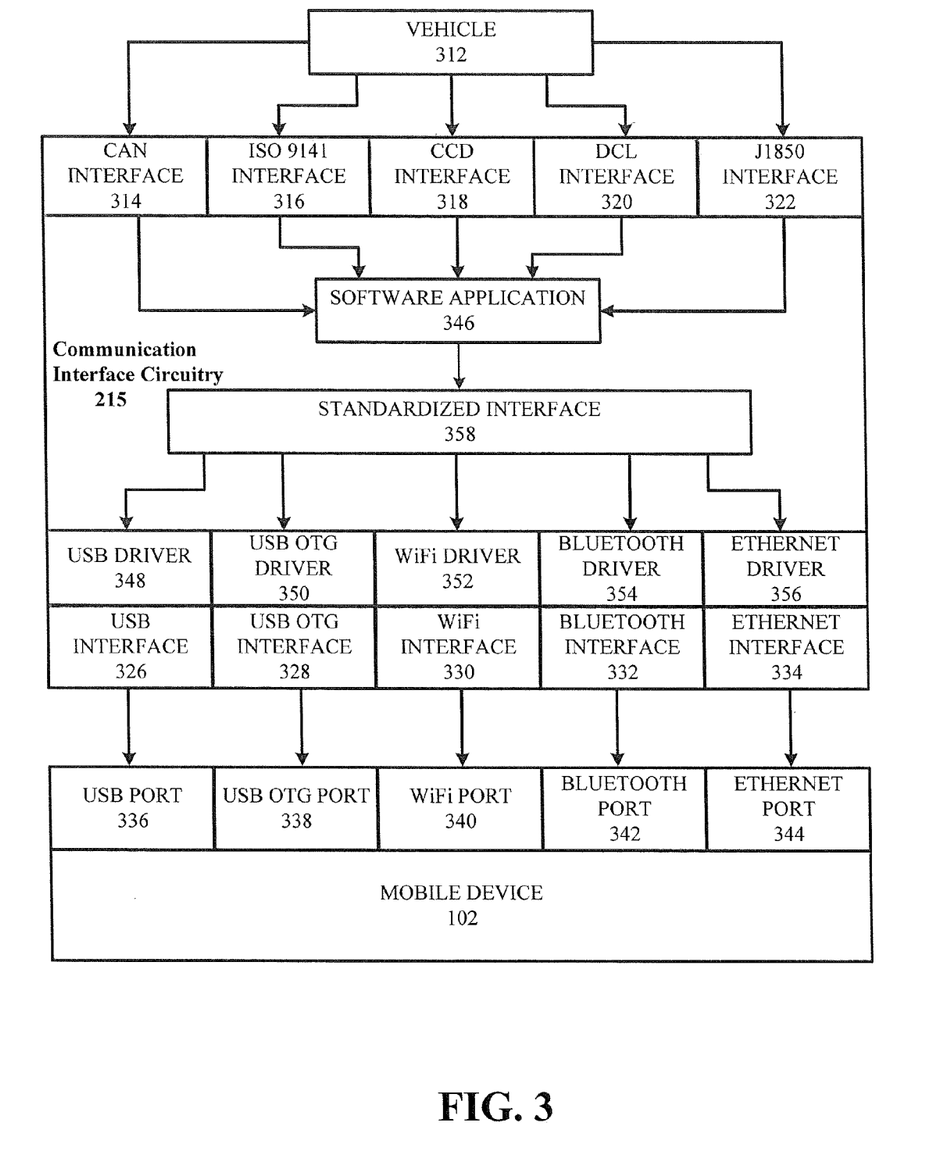
FIG. 3 is a schematic diagram of a communication interface circuitry according to an exemplary embodiment of the present disclosure.

FIG. 3 is a schematic diagram of a communication interface circuitry 215 according to an exemplary embodiment of the present disclosure. As illustrated in FIG. 3, the communication interface circuitry 215 may be connected to a vehicle 312 through a plurality of vehicular interfaces 314, 316, 318, 320, 322 and to the mobile device 102 through a plurality of host system interfaces 326, 328, 330, 332, 334. More specifically, the docking station 100 interfaces 326, 328, 330, 332, 334 are connected, either physically or wirelessly, to a plurality of respective ports 336, 338, 340, 342, 344 of the mobile device 102.

Although the CAN, ISO 9141, CCD, DCL and J1850 protocols are illustrated in FIG. 3 as being used by the vehicular interfaces 314, 316, 318, 320, 322, respectively, other protocols may also be used by one or more of the interfaces according to certain embodiments of the present disclosure. Also, although the USB, USB On-The-Go (OTG), WiFi™, Bluetooth® and Ethernet protocols are illustrated in FIG. 3 as being used by the mobile device interfaces 326, 328, 330, 332, 334, respectively, the use of other protocols by one or more of these interfaces is also within the scope of certain embodiments of the present disclosure.

In addition to the components listed above, the communication interface circuitry 215 illustrated in FIG. 3 also includes a software application 346, a plurality of software drivers 348, 350, 352, 354, 356, and a standardized interface 358 that operates between the software application 346 and software drivers 348, 350, 352, 354, 356. Although not explicitly illustrated in FIG. 3, the software application 346, software drivers 348, 350, 352, 354, 356 and standardized interface 358 may all be implemented on one or more processors and/or memory storage location(s) that may be included within the communications interface circuitry 215.

The software application 346 is configured to process data received from the vehicle 312 through one of the vehicular interfaces 314, 316, 318, 320, 322 of the communications interface circuitry 215. The software application 345 can translate data received from the vehicle 312 into a signal that may be understood by the mobile device 102. For example, the software application 346 can translate data received from the vehicle's antilock braking system into a signal that the mobile device 102 can recognize as being indicative of a malfunction in the brakes.

According to certain embodiments of the present disclosure, after the software application 346 has processed the data received from the vehicle 312, the data is forwarded on to the standardized interface 358. Since the standardized interface 358 is configured to communicate with the software application 346 and each of the software drivers 348, 350, 352, 354, 356, this communication typically takes place using a single protocol. In the embodiment of the present disclosure as illustrated in FIG. 3, the protocol used is the Transmission Control Protocol/Internet Protocol (TCP/IP) protocol. However, other protocols may also be used.

Because the mobile device interfaces 326, 328, 330, 332, 334 are typically not configured to communicate with the mobile device 102 using the TCP/IP protocol, each of the software drivers 348, 350, 352, 354, 356 is typically configured to communicate with the mobile device interfaces to which it is connected using another communications protocol. For example, while the leftmost software driver 348 and rightmost software driver 356 illustrated in FIG. 3 both communicate with the standardized interface 358 using the TCP/IP protocol, the leftmost software driver 348 is configured to communicate with the leftmost mobile device interface 326 using the USB protocol while the rightmost software driver 356 is configured to communicate with the rightmost host system interface 334 using the Ethernet protocol.

According to certain embodiments of the present disclosure, the standardized interface 358 is configured to assign an IP address to the mobile device 102 that is electronically connected to at the one of the mobile device interfaces 326, 328, 330, 332, 334. This allows for the above-discussed TCP/IP protocol to be implemented.

As illustrated in FIG. 3, some of the mobile device interfaces (e.g., USB interface 326, USB OTG interface 328 and Ethernet interface 334) are configured to be physically connected to the mobile device 102. Such physical connection may be established, for example, using the adapter 116. As also illustrated in FIG. 3, some of the host system interfaces (e.g., WiFi™ interface 330 and Bluetooth® interface 332) are configured to communicate wirelessly with the mobile device 102.

According to certain embodiments of the present disclosure, the communications protocol used between a first software driver and a first mobile device interface differs from the communications protocol used between a second software driver and a second mobile device interface. For example, communications protocols used within the communications interface circuitry 215 can include two or more of the RS232 protocol, the USB protocol, the USB OTG protocol, the Ethernet protocol, the Bluetooth® protocol and the WiFi™ protocol. Of course, the use of other communications protocols is also within the scope of the present disclosure.

Figure 4:
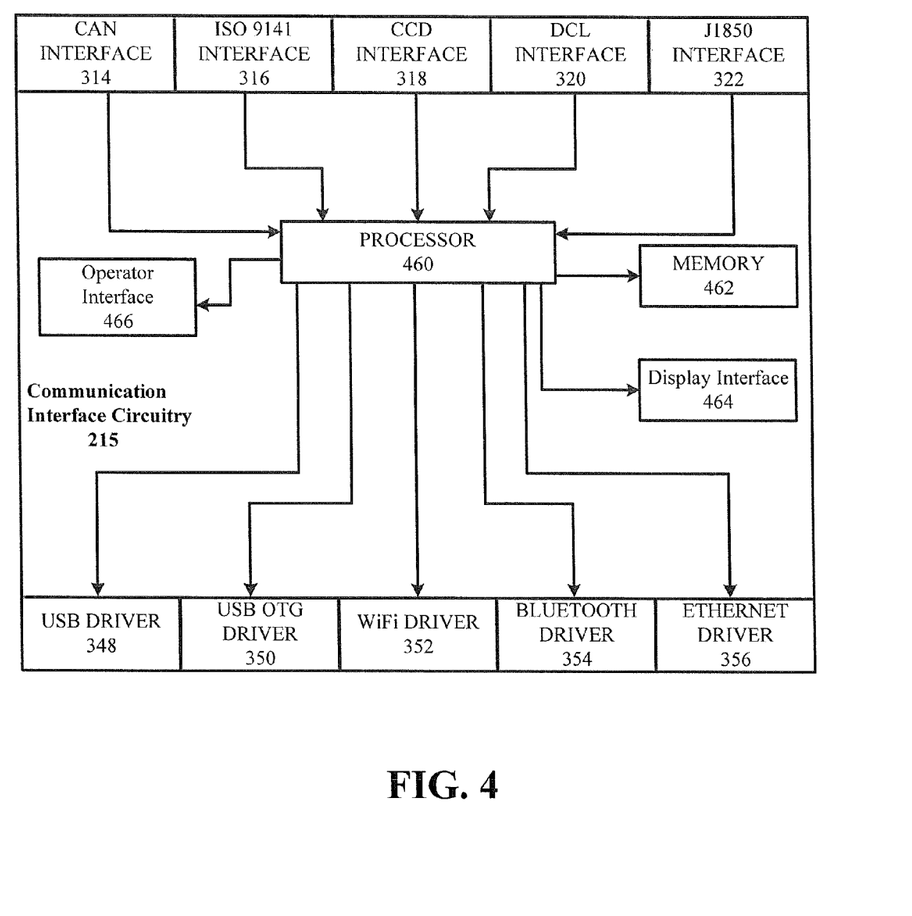
FIG. 4 is a schematic diagram of components of the communications interface circuitry illustrated in FIG. 3 according to an exemplary embodiment of the present disclosure.

FIG. 4 is a schematic diagram of components of the communications interface circuitry 215 illustrated in FIG. 3 according to an exemplary embodiment of the present disclosure. More specifically, FIG. 4 illustrates that the communications interface circuitry 215 may include not only the vehicular interfaces 314, 316, 318, 320, 322 discussed above but also a processor 460, memory 462, a display interface 464 and an operator interface 466. In this embodiment of the present disclosure, the software application 346 and software drivers 348, 350, 352, 354, 356 are implemented using the processor 460 and, if necessary, may be partially or completely stored in the memory 462. Although not included in all the communications interface circuitry 215 according to the present disclosure, the display interface 464 and operator interface 466 may, for example, allow an operator to see the status of the docking station 100, may obtain information from the software application 346 and/or may allow for an operator to provide input to the docking station using, for example, a touch screen or keypad as the operator interface 466.

Figure 5:
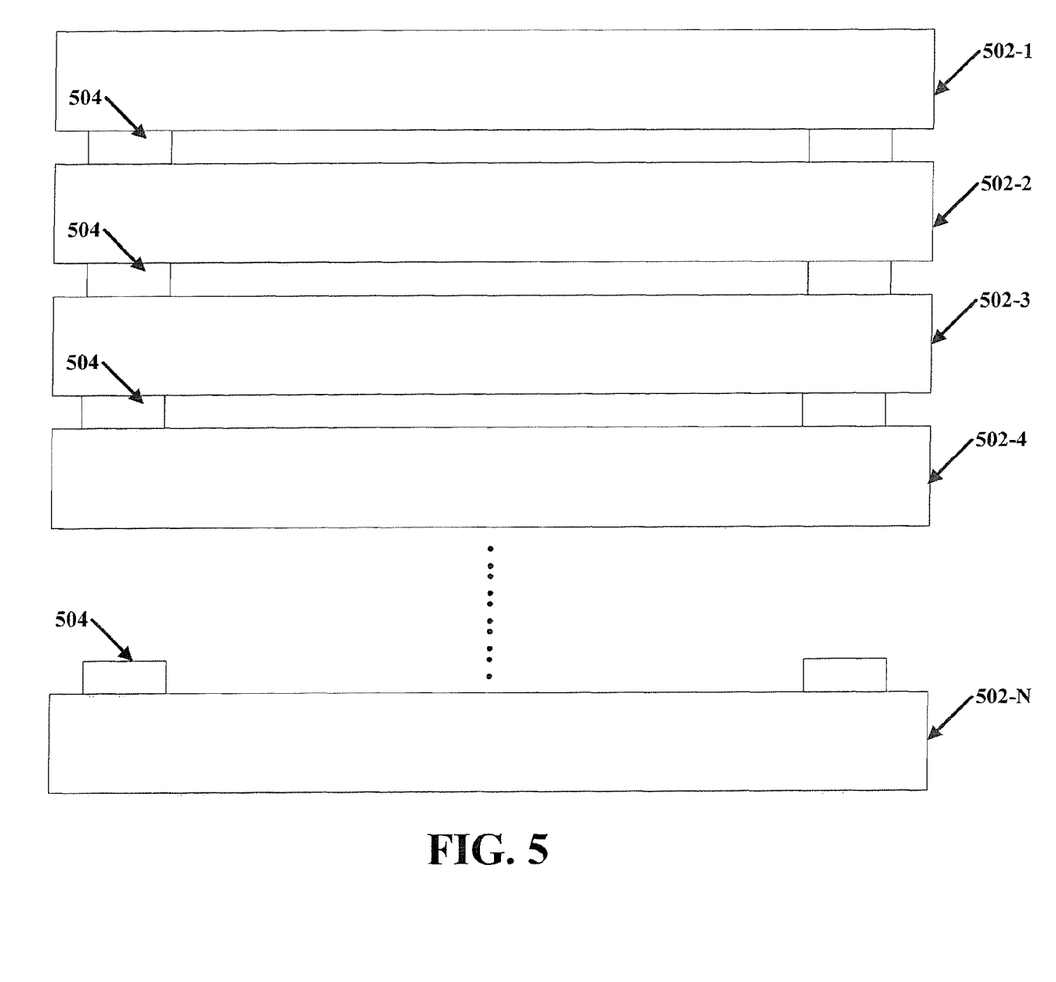
FIG. 5 illustrates a modular configuration of the docking station according to an exemplary embodiment of the present disclosure.

FIG. 5 illustrates a modular configuration of the docking station 100 according to an exemplary embodiment of the present disclosure. For example, the docking station 100 may include a plurality of modular apertures 502-1 to 502-N. Each of the plurality of modular apertures 502-1 to 502-N may be configured in series or in parallel. The module aperture 502 may allow a user of the docking station 100 to install additional hardware, modules, and software in order to perform various functions. The plurality of modular apertures 502-1 to 502-N may be arranged in a vertical plane (e.g., on top of each other) or a horizontal plane (e.g., side by side). In an exemplary embodiment, each of the plurality of modular apertures 502-1 to 502-N may receive a circuit board or modules that may perform a specific function. The modularity of the docking station 100 may allow a user to customize (e.g., install specific hardware, modules and software) various functions performed by the docking station 100.

Hardware that may be installed may include, but not limited to, central processing unit (CPU), chipset, random-access memory (RAM), basic input/output system (BIOS), read-only memory (ROM), buses, bus controllers, power supply, media devices, secondary storage device, sound card, video graphic card, drivers, interfaces, and other hardware that may be supported by the modular aperture to perform various functions. Software that may be installed may include various flash software, domestic vehicle software, foreign vehicle software, ABS/Air Bag software, update software, InfoTech software, and other software that may control and operate various hardware of the docking station 100.

Modules that may be installed may include, but not limited to, diagnostic module, AutoCode module, Code Scanner module, brake diagnostic module, scope module, on-board diagnostic (OBD) module, multimeter module, testing module, timing lights module, digital pressure module, fuel injection and ignition module, emission module, analyzer module, electrical system module, alternator and starter module, suspension and steering module, engine module, transmission module, fuel & A/C module, brake module, credit card module, communication module, and other modules that may be supported by the modular aperture to perform various functions.

Each of the plurality of modular apertures 502-1 to 502-N may be interconnected with connectors 504 that may form an expandable communication bus or busses for the installed hardware. The connectors 504 may provide I/O and communications between each of the plurality of modular apertures 502-1 to 502-N and power the installed hardware. The connectors 504 may include for example, but not limited to, industry standard architecture (ISA) bus (PC/104), peripheral component interconnect (PCI) bus, parallel bus, serial bus or any other bus that may transfer data between each of the plurality of modular apertures 502-1 to 502-N.

Figure 6:
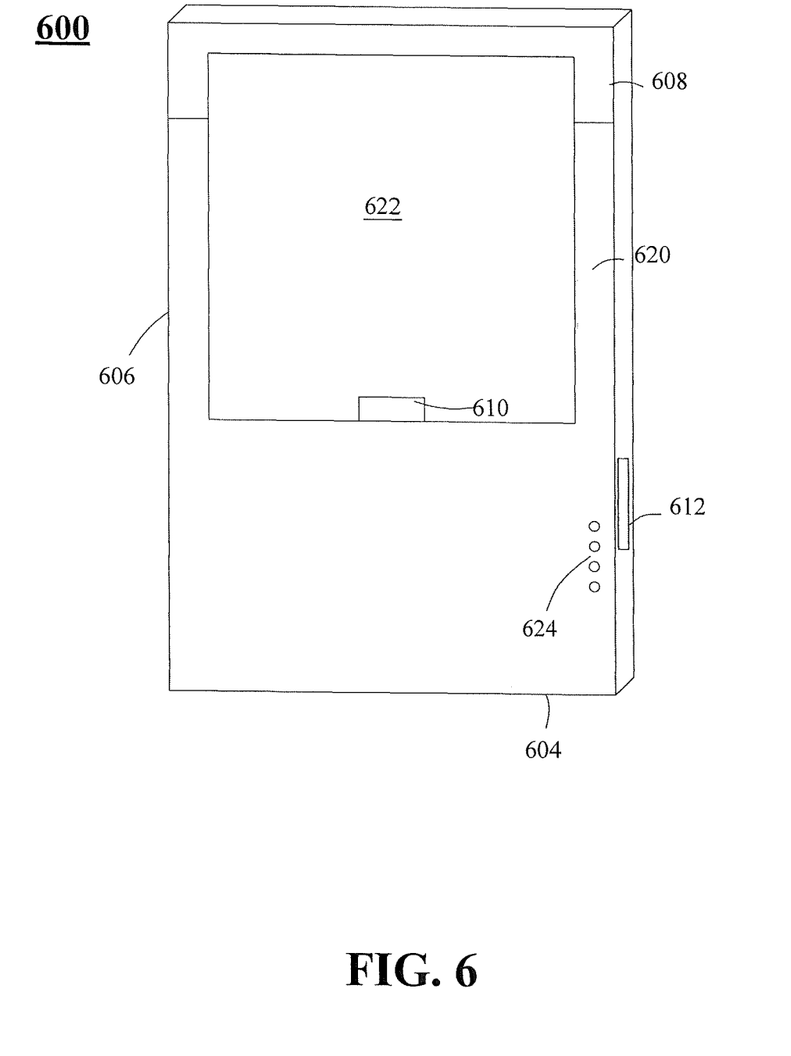
FIG. 6 is a schematic diagram of a docking station according to another exemplary embodiment of the present disclosure.

Each of FIGS. 6-9 below include the components described in FIGS. 2-5. FIG. 6 is a schematic diagram of a docking station according to another exemplary embodiment of the present disclosure. The docking station 600 may be similar to the docking station 100 depicted in FIG. 1, except that the docking station 600 may be formed of a body 604 that may include a receiving portion 606 and a locking portion 608, which is removable. The receiving portion 606 may receive the mobile device 102 and the locking portion 608 may secure the mobile device 102 within the receiving portion 606. The mobile device 102 may be coupled to the docking station 600 via an adapter 610. The docking station 600 may comprise a power connecting port 612 that may charge a portal power source (not shown) of the docking station 600. The receiving portion 606 may comprise a protective enclosure 620 configured to protect the mobile device 102. The protective enclosure 620 may comprise a display portion 622 that may correspond to a display of the mobile device 102. The docking station 600 may comprise an status indicator 624 that may indicate status of functions performed by the docking station 600.

Figure 7A:
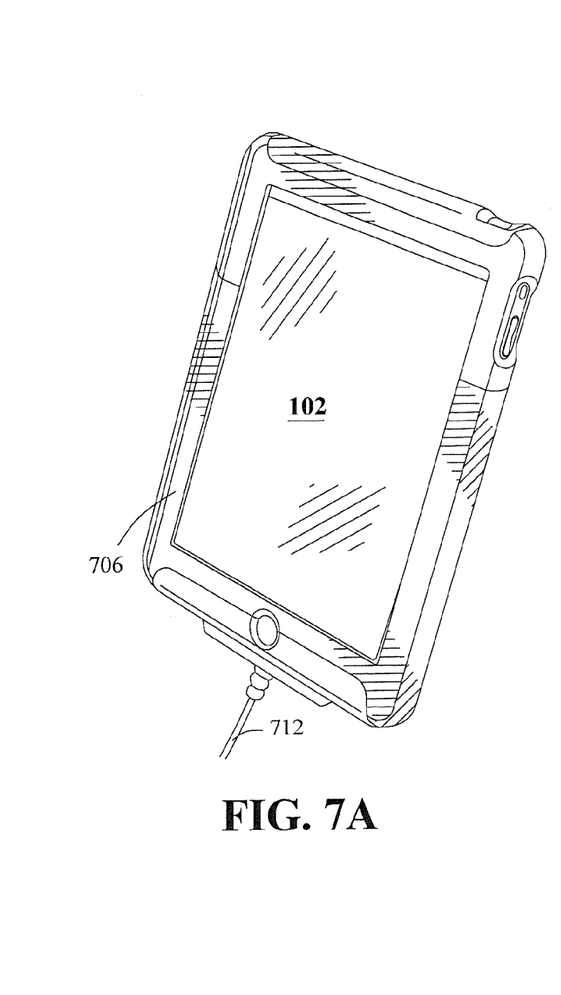
FIGS. 7A-D are schematic diagrams of a docking station according to another exemplary embodiment of the present disclosure.
Figure 7B:
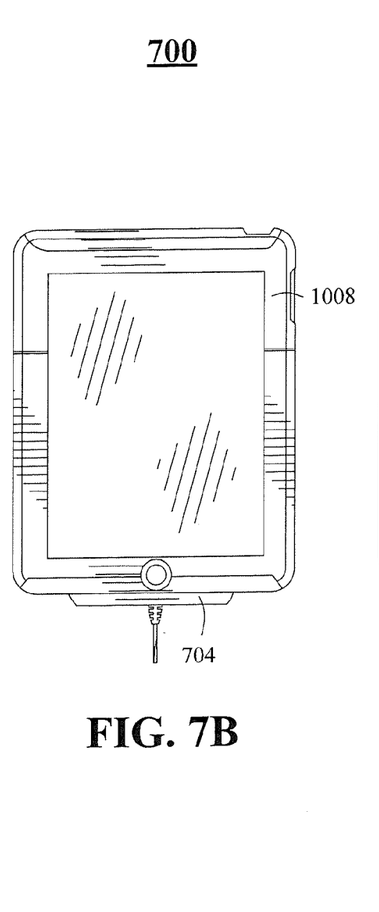
Figure 7C:
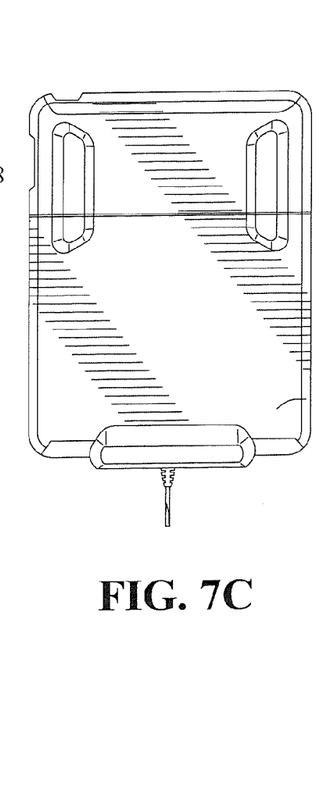
Figure 7D:
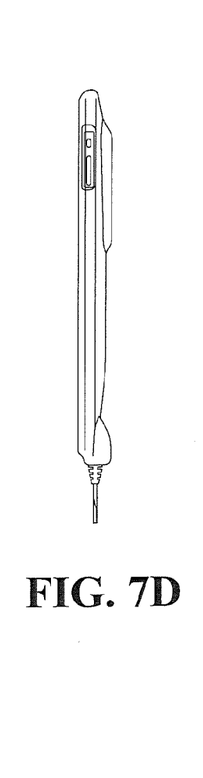

FIGS. 7A-D are schematic diagrams of a docking station according to another exemplary embodiment of the present disclosure. In particular, FIG. 7A illustrates a perspective view of the docking station 700, FIG. 7B illustrates a front view of the docking station 700, FIG. 7C illustrates a back view of the docking station 700 and FIG. 7D illustrates a side view of the docking station 700. The docking station 700 may be similar to the docking station 100 depicted in FIG. 1, except that the docking station 700 may be formed of a body 704 that may include a receiving portion 706 and a locking portion 708. The receiving portion 706 may receive the mobile device 102 and the locking portion 708, which is removable and may secure the mobile device 102 within the receiving portion 706. The docking station 700 may comprise a power connector 712 that may provide power to the docking station 700 and the mobile device 102. The receiving portion 706 may comprise a protective enclosure 720 configured to protect the mobile device 102.

Figure 8A:
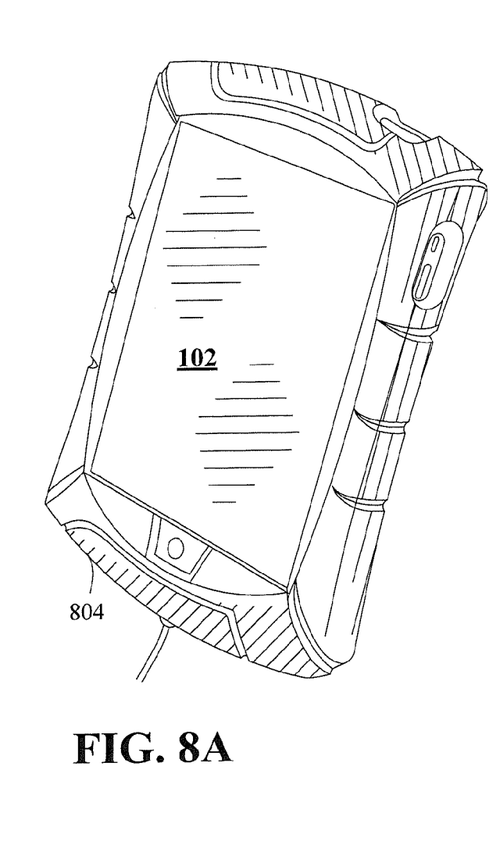
FIGS. 8A-D are schematic diagrams of a docking station according to another exemplary embodiment of the present disclosure.
Figure 8B:
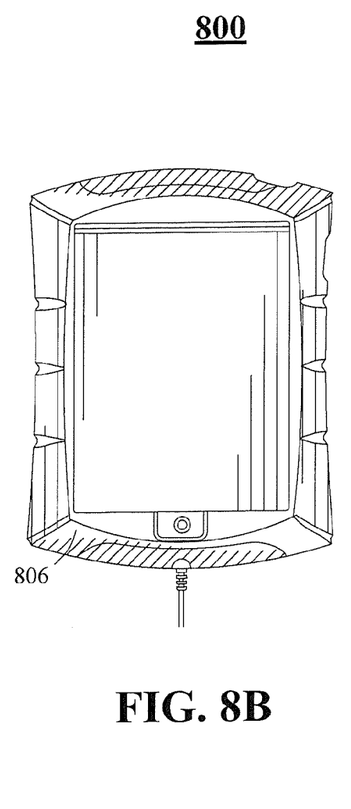
Figure 8C:
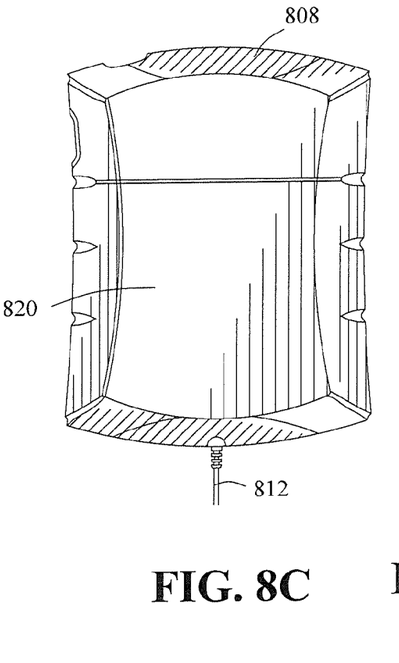
Figure 8D:
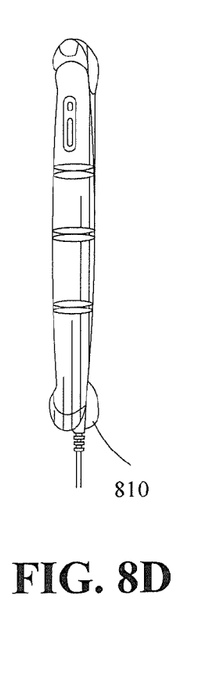

FIGS. 8A-D are schematic diagrams of a docking station according to another exemplary embodiment of the present disclosure. In particular, FIG. 8A illustrates a perspective view of the docking station 800, FIG. 8B illustrates a front view of the docking station 800, FIG. 8C illustrates a back view of the docking station 800 and FIG. 8D illustrates a side view of the docking station 800. The docking station 800 may be similar to the docking station 100 depicted in FIG. 1, except that the docking station 800 may be formed of a body 804 that may include a receiving portion 806 and a locking portion 808. The receiving portion 806 may receive the mobile device 102 and the locking portion 808 may securely position the mobile device 102 within the docking station 800. The mobile device 102 may be coupled to the docking station 800 via an adapter 810. The docking station 800 may comprise a power connector 812 that may provide power the docking station 800 and the mobile device 102. The receiving portion 806 may comprise a protective enclosure 820 configured to protect the mobile device 102. The protective enclosure 820 may comprise a material that may protect the mobile device 102 from external pressure.

Figure 9A:
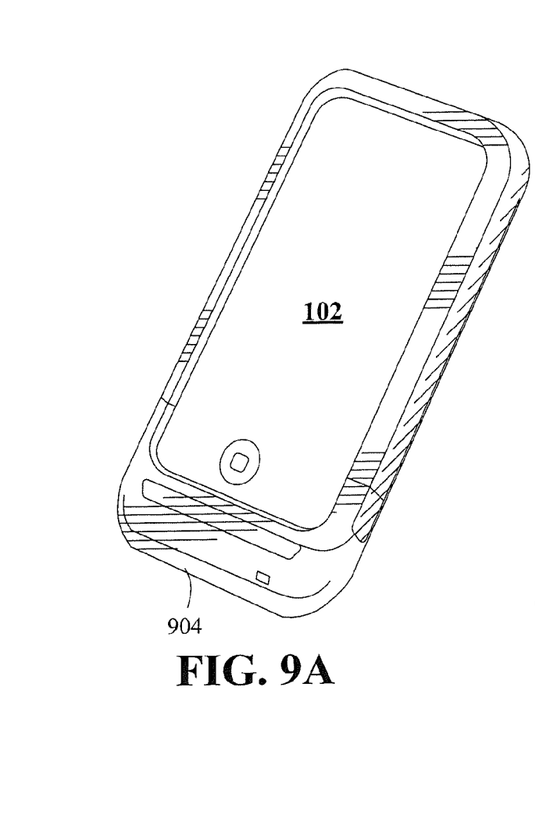
FIGS. 9A-D are schematic diagrams of a docking station according to another exemplary embodiment of the present disclosure.
Figures 9B, 9C:
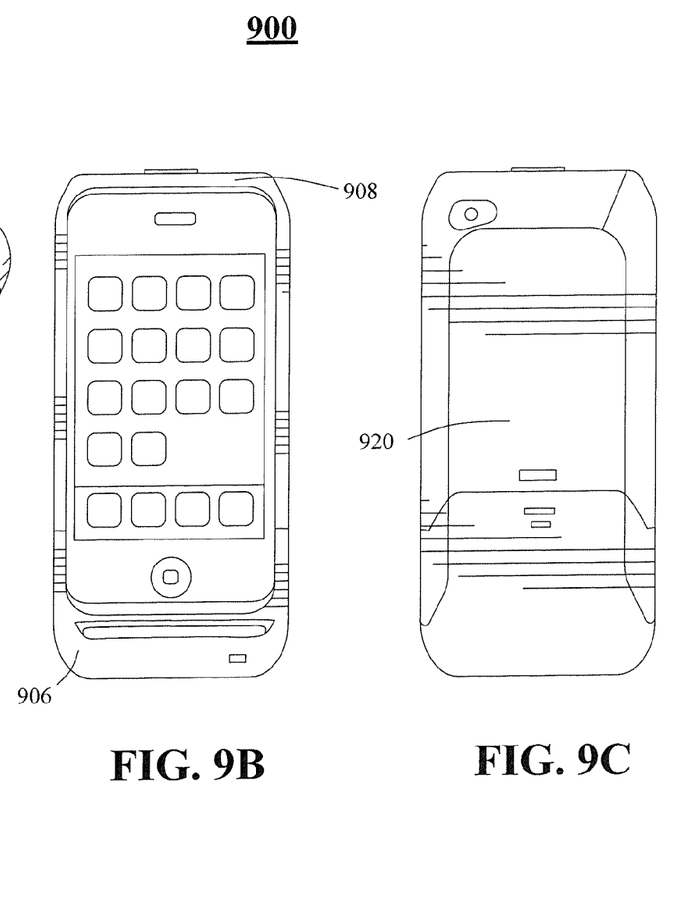
Figure 9D:
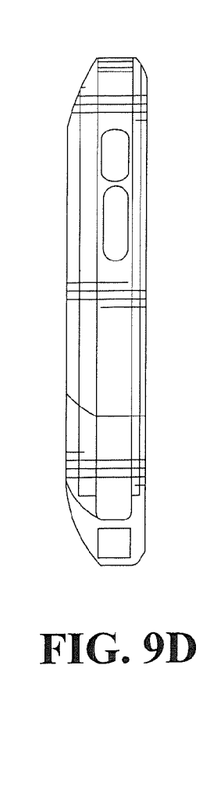

FIGS. 9A-D are schematic diagrams of a docking station according to another exemplary embodiment of the present disclosure. In particular, FIG. 9A illustrates a perspective view of the docking station 900, FIG. 9B illustrates a front view of the docking station 900, FIG. 9C illustrates a back view of the docking station 900 and FIG. 9D illustrates a side view of the docking station 900. The docking station 900 may be similar to the docking station 100 depicted in FIG. 1, except that the docking station 900 may be formed of a body 904 that may include a receiving portion 906 and a locking portion 908. The receiving portion 906 may receive the mobile device 102 and the locking portion 908 may securely position the mobile device 102 within the docking station 900. The receiving portion 906 may comprise a protective enclosure 920 configured to protect the mobile device 102. The protective enclosure 920 may comprise a material that may protect the mobile device 102 from external pressure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A modular docking station, comprising:
a base component comprising a plurality of modular apertures, wherein each of the plurality of modular apertures is configured to receive a hardware to perform a specific function;
a receiving component configured to receive a mobile device, wherein the receiving component comprises a protective enclosure configured to surround the mobile device in order to protect the mobile device;
a coupler configured to couple the receiving component to the base component; and
a connection lead configured to connect to terminals of a battery.

2. The modular docking station of claim 1, wherein the connection lead includes a cable extending from the base component, the cable having clips configured to connect to the terminals of a battery.

3. The modular docking station of claim 2, wherein the clips are configured to provide a Kelvin type connection to the terminals of the battery.

4. The modular docking station of claim 3, wherein the clips are configured to connect to the terminals of a battery of a vehicle.

5. The modular docking station of claim 1, further comprising test circuitry implemented in at least one of the base component and the receiving component,
wherein the test circuitry is configured to be electrically coupled to the terminals of the battery by the connection lead.

6. The modular docking station of claim 5, wherein the test circuitry is configured to perform at least one type of test on the battery when the connection lead is connected to the terminals of the battery.

7. The modular docking station of claim 1, wherein the base component further comprises an inputting component.

8. The modular docking station of claim 1, wherein each of the plurality of modular apertures is connected by a connector.

9. The modular docking station of claim 8, wherein the connector comprises at least one of the following: an industry standard architecture (ISA) bus (PC/104), a peripheral component interconnect (PCI) bus, a parallel bus, and a serial bus.

10. The modular docking station of claim 1, wherein the receiving component further comprises an adapter for connecting the mobile device.

11. The modular docking station of claim 10, wherein the adapter comprises at least one of the following: a serial port, a USB port, an infrared port, and an RS 232 port.

12. The modular docking station of claim 1, wherein the protective enclosure comprises a transparent display portion that corresponds to a display of the mobile device.

13. The modular docking station of claim 1 further comprising a communication interface circuitry that generates one or more communications protocol to communicate with a vehicle.

* * * * *